(12) United States Patent  (10) Patent No.: US 7,651,651 B2
Riffer  (45) Date of Patent: *Jan. 26, 2010

(54) PLASTIC CLOSURE WITH COMPRESSION MOLDED SEALING/BARRIER LINER

(75) Inventor: David B. Riffer, Perrysburg, OH (US)

(73) Assignee: Rexam Closure Systems Inc., Perrysburg, OH (US)

( * ) Notice: Subject to any disclaimer, the term of this patent is extended or adjusted under 35 U.S.C. 154(b) by 1480 days.

This patent is subject to a terminal disclaimer.

(21) Appl. No.: 10/680,840

(22) Filed: Oct. 7, 2003

(65) Prior Publication Data

US 2004/0130054 A1 Jul. 8, 2004

Related U.S. Application Data

(62) Division of application No. 10/046,690, filed on Jan. 16, 2002, now Pat. No. 6,677,016, which is a division of application No. 08/998,072, filed on Dec. 24, 1997, now Pat. No. 6,371,318.

(51) Int. Cl.
*B29C 70/80* (2006.01)
*B65D 41/04* (2006.01)

(52) U.S. Cl. .................. 264/268; 264/141; 215/341

(58) Field of Classification Search .............. 264/268, 264/141, 142; 215/341, 347, 351
See application file for complete search history.

(56) References Cited

U.S. PATENT DOCUMENTS

| | | | |
|---|---|---|---|
| 3,147,874 A | * | 9/1964 | Hundt et al. ................ 215/328 |
| 3,480,170 A | | 11/1969 | Evans et al. |
| 3,524,905 A | | 8/1970 | Coates |
| 3,716,612 A | | 2/1973 | Schrenk et al. |
| 3,857,754 A | | 12/1974 | Hirata et al. |
| 3,931,449 A | | 1/1976 | Hirata et al. |
| 3,975,463 A | | 8/1976 | Hirata et al. |
| 4,151,924 A | | 5/1979 | Jameson |
| 4,254,169 A | | 3/1981 | Schroeder |
| 4,254,170 A | | 3/1981 | Roullet |
| 4,284,671 A | | 8/1981 | Cancio et al. |
| 4,309,465 A | | 1/1982 | Kornbaum |
| 4,312,824 A | * | 1/1982 | Mori et al. ................ 264/135 |
| 4,343,754 A | | 8/1982 | Wilde et al. |
| 4,360,120 A | | 11/1982 | Samuel et al. |
| 4,368,828 A | | 1/1983 | Samuel et al. |

(Continued)

FOREIGN PATENT DOCUMENTS

EP 0129309 12/1984

(Continued)

*Primary Examiner*—Matthew J. Daniels
(74) *Attorney, Agent, or Firm*—Reising Ethington PC (57) ABSTRACT

A plastic closure that comprises a cap having a base with a peripheral skirt defining the cap interior and threads on the skirt for securing the closure to a container. A liner is secured to the interior of the cap, preferably by being compression molded in situ on the base. The liner consists essentially of a multiplicity of alternating layers of a matrix polymer material such as EVA and a barrier material such as EVOH to resist transmission of gas, water vapor and/or flavorants through the liner. The matrix polymer material preferably is preblended with a compatibilizer material such as a maleic anhydride grafted polymer that ties the matrix polymer material to the barrier material.

55 Claims, 5 Drawing Sheets

U.S. PATENT DOCUMENTS

| | | |
|---|---|---|
| 4,407,422 A | 10/1983 | Wilde et al. |
| 4,410,482 A | 10/1983 | Subramanian |
| 4,416,942 A | 11/1983 | DiLuccio |
| 4,444,817 A | 4/1984 | Subramanian |
| 4,462,502 A | 7/1984 | Luenser et al. |
| 4,476,987 A | 10/1984 | Nolan |
| 4,518,336 A | 5/1985 | Alieri |
| 4,525,134 A | 6/1985 | McHenry |
| 4,533,576 A | 8/1985 | Tanahashi et al. |
| 4,568,529 A | 2/1986 | Leconte |
| 4,578,295 A | 3/1986 | Jabarin |
| 4,658,976 A | 4/1987 | Pohlenz |
| 4,705,708 A | 11/1987 | Briggs et al. |
| 4,723,678 A | 2/1988 | Kollen |
| 4,984,703 A | 1/1991 | Burzynski |
| 5,003,002 A | 3/1991 | Ofstein |
| 5,045,594 A | 9/1991 | Samuel et al. |
| 5,053,258 A | 10/1991 | Booze et al. |
| 5,064,716 A | 11/1991 | Chou et al. |
| 5,094,793 A | 3/1992 | Schrenk et al. |
| 5,183,848 A | 2/1993 | Samuel et al. |
| 5,186,991 A | 2/1993 | Samuel et al. |
| 5,202,074 A | 4/1993 | Schrenk et al. |
| 5,211,974 A * | 5/1993 | White ........................ 426/106 |
| 5,306,542 A | 4/1994 | Bayer |
| 5,362,531 A | 11/1994 | Samuel et al. |
| 5,380,479 A | 1/1995 | Schrenk et al. |
| 5,430,098 A | 7/1995 | Samuel et al. |
| 5,451,360 A | 9/1995 | Ingram |
| 5,486,558 A | 1/1996 | Lee |
| 5,605,996 A | 2/1997 | Chuu |
| 5,628,950 A | 5/1997 | Schrenk et al. |
| 5,700,412 A | 12/1997 | Mehra |
| 5,731,053 A | 3/1998 | Kuhn et al. |
| 6,371,318 B1 | 4/2002 | Riffer |

FOREIGN PATENT DOCUMENTS

| | | |
|---|---|---|
| EP | 0142183 | 5/1985 |
| EP | 0153068 | 8/1985 |
| EP | 0215671 | 3/1987 |
| EP | 0219265 | 4/1987 |
| EP | 0278403 | 8/1988 |
| EP | 0306820 | 3/1989 |
| GB | 1112025 | 5/1968 |
| GB | 2158383 | 11/1985 |
| GB | 2158423 | 11/1985 |
| GB | 2180521 | 4/1987 |
| JP | 62263250 | 11/1987 |
| WO | 9735779 | 10/1997 |

* cited by examiner

PLASTIC CLOSURE WITH COMPRESSION MOLDED SEALING/BARRIER LINER

This application is a division of application Ser. No. 10/046,690 filed Jan. 16, 2002, now U.S. Pat. No. 6,677,016, which is a division of application Ser. No. 08/998,072 filed Dec. 24, 1997 and now U.S. Pat. No. 6,371,318.

The present invention is directed to plastic container closures for beverage, food, juice, pharmaceutical and like applications, and more particularly an improved process for providing closures with sealing liners having resistance to transmission of gases, water vapor and/or flavorants (flavor scalping).

Reference is made to concurrently filed application Ser. No. 08/997,871 filed Dec. 24, 1997, now U.S. Pat. No. 6,399,170 entitled "Plastic Closure with Compression Molded Barrier Liner" and assigned to the assignee hereof.

BACKGROUND AND OBJECTS OF THE INVENTION

It has heretofore been proposed to provide a plastic closure for a container that comprises a plastic cap with an interior liner for sealing engagement with the sealing surface of the container. For example, U.S. Pat. No. 4,984,703 discloses a plastic closure that comprises a cap having a base with a peripheral skirt and threads for securing the cap to a container, and a sealing liner compression molded in situ to the interior of the cap base. The sealing liner comprises a blend of ethylene vinyl acetate (EVA) and a thermoplastic elastomeric material such as olefin or styrene-butadiene-styrene. U.S. Pat. No. 5,451,360 discloses a method and apparatus for compression molding the liner in situ within the caps.

Although the closures and methods of manufacture disclosed in the noted patents address problems theretofore extant in the art, further improvements remain desirable. For example, although soft olefin copolymers such as EVA are sufficiently resilient to provide good sealing against the sealing surface of a container when the closure is fastened to the container, these materials do not provide an acceptable barrier against transmission of gases such as oxygen and carbon dioxide that can deleteriously affect the product within the container. It has heretofore been proposed to employ a barrier material such as ethylene vinyl alcohol (EVOH) as a gas transmission barrier layer. However, materials of this character tend to be expensive and brittle, and are not well suited to function as a seal. It is therefore a general object of the present invention to provide a liner for a plastic closure that combines the functions of a seal for engagement with the container sealing surface and an improved barrier against gas transmission, flavor absorption (flavor scalping) and/or water vapor permeation. Another and more specific object of the present invention is to provide a liner of the described character that is of readily moldable and inexpensive composition. Yet another object of the invention is to provide a liner that satisfies the foregoing objectives and is of clear or translucent construction to permit reading through the liner of printing on the closure. A further object of the present invention is to provide a method of fabricating such a liner, and a plastic closure embodying such a liner.

SUMMARY OF THE INVENTION

A plastic closure in accordance with one aspect of the present invention comprises a plastic cap having a base with a peripheral skirt defining the interior of the cap and threads or other suitable means on the skirt for securing the closure to a container. A liner is secured to the interior of the base. The liner consists essentially of a multiplicity of alternating layers of a matrix polymer and a barrier material to resist transmission of gas through the liner parallel to the plane of the liner. The liner in the preferred embodiment of the invention is compression molded in situ within the cap, and includes at least nine alternating layers of matrix polymer and barrier materials, preferably at least thirty-three alternating layers, and most preferably one hundred twenty-nine alternating layers.

The "matrix polymer" is a thermoplastic elastomer, a soft olefin polymer, or a combination thereof. A thermoplastic elastomer is a synthetic polymer having the processability of a thermoplastic material and the functional performance and properties of a conventional thermoset rubber. There are six generic classes of thermoplastic elastomer commercially available, including styrenic block, copolymers (SBC), polyolefin blends (TPO), elastomeric alloys, thermoplastic polyurethanes (TPU), thermoplastic copolyesters and thermoplastic polyamides. Thermoplastic elastomers are described beginning at page 64 in *Modern Plastics Encyclopedia Handbook*, published by McGraw-Hill, 1994, the disclosure of which is incorporated by reference. Examples of thermoplastic elastomers are styrene block copolymers as manufactured by Shell Chemical under the trademark KRATON. These synthetic polymers consist of three discrete blocks of the linear or A-B-A type: styrene. An elastomeric alloy is ethylene-propylene-diene terpolymer (EPDM). Another elastomeric alloy consists of compounds of EPDM/PP and butyl rubber/PP as manufactured by Advanced Elastomer Systems under the tradenames SANTOPRENE and TREFSIN and disclosed in U.S. Pat. Nos. 4,130,535, 4,311,628, 4,130,534 and 4,607,074. In general, thermoplastic elastomers are characterized by a Shore A hardness of 45 to 95 and a flexural modulus of 30,000 to 100,000 psi.

Soft olefin polymers are thermoplastic olefins, homopolymers and copolymers which are flexible, elastic with a Shore A hardness of less than about 100. Typical soft olefin polymers are: metallocene-made polyethylene, ethylene-propylene rubbers, ethylene copolymers and blends thereof, ethylene copolymers such as ethylene vinyl acetate, ethylene methyl acrylate copolymers and ionomers and combinations thereof. Examples of soft olefin polymers are alpha olefin substituted polyethylenes manufactured using single site catalyst technology (these materials are known in the art as metallocene-made polyethylenes); ethylene vinyl acetate (EVA) such as manufactured by DuPont under the trademark ELVAX; polypropylene made with single site catalyst technology known in the art as metallocene-made polypropylenes; syndiotactic polypropylenes as marketed by Fina Oil and Chemical; ethylene/propylene copolymers and styrene-ethylene interpolymers as marketed by Dow Chemical; and ionomers such as DuPont's SURLYN product line.

The matrix polymer is typically compounded with antioxidants, lubricants and other stabilizing materials, as known in the art.

A "compatibilizer" is a thermoplastic that ties two other thermoplastics together by a reactive (covalent or dipole-dipole) bond or a non-reactive (chain entanglement) means. Examples include maleic anhydride grafted polymers or ethylene vinyl acetate grafted polymers such as Quantum Chemical's PLEXAR (trademark), Mitsui Petrochemical's ADMER (trademark) and DuPont's BYNEL (trademark) product lines, ethylene methyl acrylate, and ionomers.

A "barrier material" is a thermoplastic material that has a low gas and/or water vapor transmission rate and a high barrier to odorants and essential oils. The following materials have gas transmission rates lower than EVA, which is an industry standard liner material: EVOH (ethylene vinyl alcohol) such as Nippon Goshei's SOARNOL (trademark) product line and Evalca's EVAL (trademark) product line, nylons such as DuPont's SELAR (trademark) PA, EMS's G21 and Mitsubishi Gas' MXD6 product lines, British Petroleum's BAREX (trademark) acrylonitrile product line, blends of EVOH and amorphous nylon, blends of EVOH and an ionomer such as SURLYN (DuPont), and cyclic olefin copolymers such as marketed by Ticona. Other suitable barrier materials are blends as disclosed in U.S. Pat. Nos. 4,977,004 and 5,064,716, and nanocomposites of EVOH or nylon and clay as disclosed in U.S. Pat. Nos. 4,472,538 and 5,552,469, the disclosures of which are incorporated herein by reference.

It is currently preferred that the liner also include an additive for reducing the coefficient of friction between the liner and the sealing surface of the container. Friction reducing additives include metal stearates, microcrystalline waxes, polyethylene glycols, fatty acid esters and amides. These are known as "lubricants" in the art. The preferred lubricant is a low molecular weight fatty acid amide material that blooms to the exposed surface of the polymer material upon cooling from the melt state, thereby reducing the coefficient of friction between the liner and the container sealing surface. Examples are: primary amides with the general chemical structure R—CO—NH2, where R is an alkyl group; secondary amides with the general chemical structure R—CO—NH—R'; where R, R' are alkyl groups; secondary bis-amides with the general chemical structure R—CO—NH-A-NH—CO—R, where R, R' are alkyl groups and A is an alkylene group; and blends of the above materials such as in U.S. Pat. No. 5,306,542. The lubricant preferably comprises about 0.5% to 1.5% of the total liner composition by weight, most preferably about 0.5% by weight. The lubricant is preferably compounded into the matrix polymer material (along with any desired colorants) by the material manufacturer. The amount of lubricant and/or colorant is not included in the calculations of compositions in this application.

The barrier material and the matrix polymer in the liner are each in the amount in the range of about 2% to 50% by weight. The barrier material most preferably is provided in an amount in the range of about 6% to 35% by weight in the liner, the compatibilizer material preferably is in the range of about 6% to 20% by weight, the balance consisting of the matrix polymer.

In accordance with a second aspect of the present invention, a method of making a liner for a plastic closure comprises the steps of extruding a pellet that consists of a multiplicity of alternating layers of a matrix polymer and a barrier material that resists gas transmission, and compression molding the pellet to form a liner disk in which the alternating layers are oriented generally parallel to the plane of the disk. The layers in the pellet preferably are coextruded from inputs of barrier material, matrix polymer and compatibilizer. These materials maybe separately extruded, or the compatibilizer may be mixed with the barrier material, the matrix polymer or both prior to extrusion. In the preferred implementation of the invention, the layers in the pellet are coextruded from a second input consisting of a blend of the matrix polymer and a compatibilizer material that promotes adhesion between the material layers. The step of compression molding the liner preferably is carried out by compression molding the liner in situ within a closure cap.

Thus, in accordance with a third aspect of the present invention, there is provided a sealing liner for a plastic closure that comprises a disk that consists essentially of a multiplicity of alternating layers of matrix polymer material and a barrier material that resists transmission of oxygen and carbon dioxide through the layers. The sealing liner preferably is compression molded in situ within a plastic closure from a compression mold charge or pellet in which the alternating layers are coextruded.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
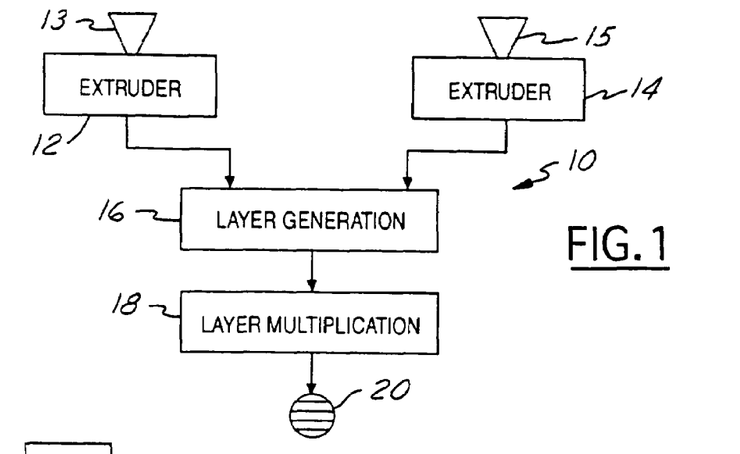
FIG. 1 is a functional block diagram of a process for fabricating compression mold charge pellets in accordance with a presently preferred embodiment of the invention.

FIG. 1 illustrates a system 10 in accordance with one presently preferred implementation of the invention as comprising a pair of extruders 12, 14 each having an associated mixing hopper 13, 15. Extruders 12, 14 direct extrudate as first and second inputs to a layer generation device 16. Layer generation device 16 forms the respective inputs into discrete generally parallel layers, and feeds the parallel layers to a layer multiplication device 18. The output of layer multiplication device 18 is an extruded rod from which discrete charge pellets 20 may be cut. Pellet 20 has parallel essentially discrete alternating layers, each layer consisting of one of the input materials to layer generator 16 from extruders 12, 14. The number of parallel layers in pellet 20 is a function of the number of stages and the construction of each stage in layer multiplication device 18. In one presently preferred implementation of the invention, layer generation device 16 and layer multiplication device 18 are as disclosed in U.S. Pat. Nos. 5,094,793 and 5,628,950, incorporated herein by reference. Other conventional layer generation schemes may be employed.

Figure 8:
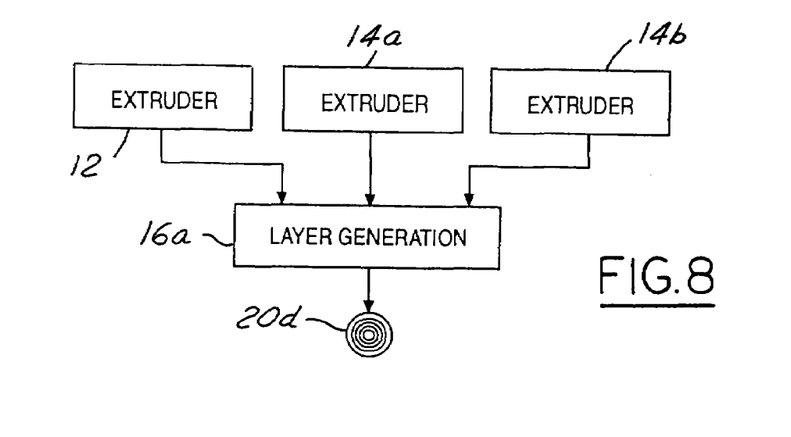
FIG. 8 is a view similar to that of FIG. 1 but showing a modified process.

FIG. 8 illustrates a modified system 10a in which the barrier polymer, the matrix polymer and the compatibilizer are fed from associated separate extruders 12, 14a, 14b to a conventional coextrusion device 16a. The resulting pellet 20d has multiple flat, spiral or coaxial layers. In a three-input system configuration as in FIG. 8, the layers of compatibilizer will be thin and disposed between each sequential layer of barrier material and matrix polymer. Suitable conventional coextrusion devices are disclosed, for example, in U.S. Pat. No. 4,522,775, and in the background discussion of U.S. Pat.

No. 5,628,950. The disclosures of these materials are incorporated herein by reference. As another modification to the embodiment of FIG. 1, barrier material can be added to the matrix polymer and compatibilizer input to extruder 14. For example, the input to extruder 14 may consist of 10% EVOH, 10% compatibilizer and 80% EVA, all by weight. Extruder 12a is operated at a lower rate so that total composition remains within the ranges discussed above. Disposition of some barrier material within the thermoplastic elastomer layers further enhances the barrier properties of the material.

For manufacture of plastic closure barrier liners in accordance with the presently preferred implementation of the invention, the input to extruder 12 or 12 a at hopper 13 preferably consists of one or more barrier polymers, while the input to extruder 14 at hopper 15 preferably consists essentially of one or more matrix polymers (TPE or soft olefin) and a compatibilizer material. The matrix polymer preferably is preblended with lubricant and any desired colorants. The input materials are thoroughly mixed and blended in hopper 15. The barrier polymer input to extruder 12 preferably is one or more high gas barrier plastic resins selected from the group consisting of EVOH, nylon, acrylonitrile copolymers such as styrene acrylonitrile and acrylonitrile methylacrylate, blends of EVOH and amorphous nylon, nanocomposites of EVOH or nylon and clay, blends of EVOH and an ionomer, acrylonitrile, cyclic olefin copolymers, and blends thereof. The matrix polymer input to extruder 14 preferably is selected from the group consisting of EVA, ethylene/propylene copolymers, styrene block copolymers, terpolymers, ionomers, thermoplastic rubbers, styrene/ethylene/butadiene/styrene block copolymers, styrene/ethylene/butadiene/styrene compounds, styrene/butadiene/styrene block copolymers, EPDM, metallocene-made linear low polyethylene, metallocene-made syndiotatic polypropylene, synthetic-elastomer alloys, rubbers such as butyl rubbers, styrene copolymers such as styrene/ethylene and terpolymers such as styrene/ethylene/butylene, polypropylene/butyl rubber, and blends thereof. The compatibilizer input to extruder 14 preferably is selected from the group consisting of maleic anhydride grafted polymers, ethylene vinyl acetate grafted polymers, ethylene methyl acrylate, ionomers and blends thereof. As noted above, a lubricant selected from the group consisting of fatty acid esters, glycols, waxes, primary amides, secondary amides, secondary bis-amides and blends thereof, preferably is preblended with the matrix polymer.

The relative percentages of the barrier polymer, the matrix polymer and the compatibilizer material depend upon the thicknesses of the respective layers formed at stages 16, 18, which in turn depend upon the extrusion flow rates at extruders 12, 14. The blend input to extruder 14 and the relative rates of extrusion preferably are such that the barrier material and the matrix polymer in the final liner are each in an amount within the range of about 2% to 50% by weight. Most preferably, the amount of barrier polymer in the final output 20 preferably is in the range of about 6% to 35% by weight, the compatibilizer material preferably is in the range of about 6% to 20% by weight, with the balance consisting of the matrix polymer. Increase in the percentage of the barrier material increases the cost of the resulting liner. Indeed, a key advantage of the present invention lies in the fact that the layered construction of the liner increases the barrier properties of the liner as compared for example with EVA/EVOH blends, so that a lesser amount of barrier material can be employed than would be the case with blended polymer liners. The amount of adhesive/compatiblizer material is selected to achieve a desirable amount of bonding between the layers, and to tailor the viscosity of the matrix polymer with which the compatibilizer is blended. It is to be noted in this respect that blending of the compatibilizer with the matrix polymer prior to extrusion eliminates a third extruder that would otherwise be necessary, and also permits the compatibilizer to be employed for tailoring the viscosity of the matrix polymer. It is considered desirable that the flow rates of the extrudates input to layer generation stage 16 be as closely matched as possible. Material flow rates are published by material manufactures, and can be employed in selecting suitable materials. By mixing EVA with a maleic anhydride compatibilizer, the viscosity of the compatibilizer is reduced more closely to match the viscosity of the EVOH. The viscosities of the separate feed streams must be adequately matched to provide proper layer formation. As taught in U.S. Pat. No. 5,628,950, the disclosure of which is incorporated herein by reference, the melt viscosity difference between the materials of the different layers should be no greater than a factor of five to provide proper layer formations.

It will be understood that the relative component percentages will vary with applications, and will depend among other factors upon hardness and therefore sealability, and desired removal torque. As to hardness, it has been found that a liner hardness higher than about 94 or 95 Shore (A) is too hard for proper sealing with the container. When employing a matrix polymer that is relatively hard, such as EVA, the upper limit of the barrier material may be relatively low. However, when employing a matrix polymer of relatively low hardness, such as polypropylene/butyl rubber, the upper limit of the barrier material may be much higher.

Figure 2:
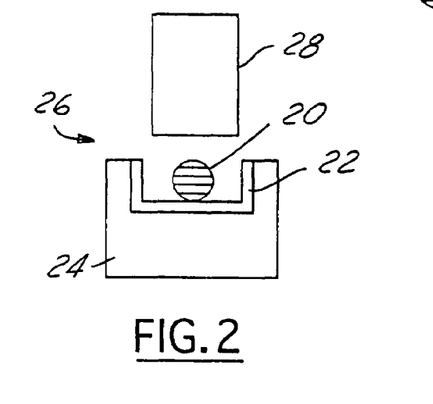
FIG. 2 is a schematic diagram that illustrates compression molding of a charge pellet to form a barrier liner in accordance with the preferred embodiment of the invention.
Figure 3:
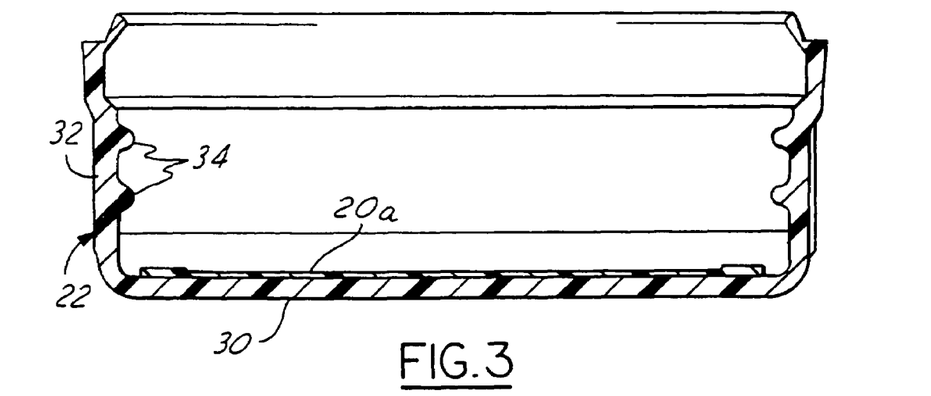
FIG. 3 is a sectioned elevational view on an enlarged scale of a plastic closure fabricated in accordance with the preferred method of the invention illustrated in FIGS. 1 and 2.
Figure 6:
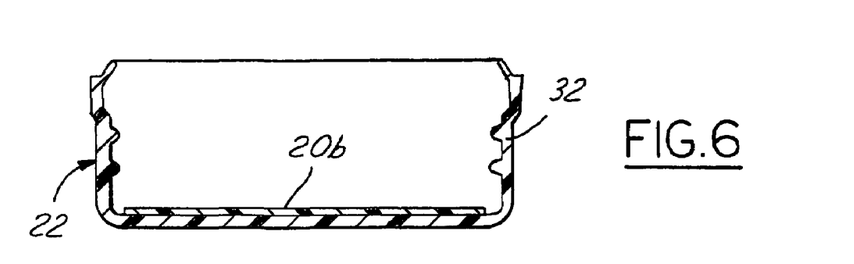
FIGS. 6 and 7 are views similar to that of FIG. 3 but showing modified liner geometries.
Figure 7:
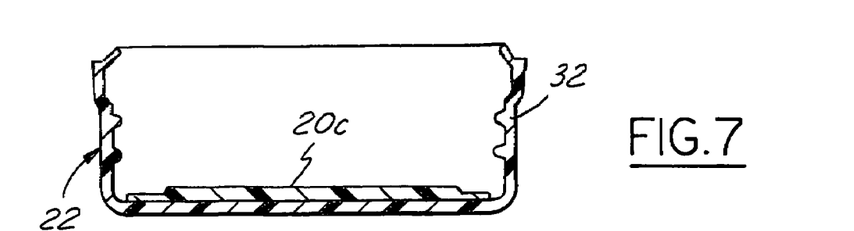

FIG. 2 illustrates a charge pellet 20 placed within a prefabricated plastic closure cap 22 in the female die 24 of a compression mold 26. A male die section 28 is closed against pellet 20, cap 22 and die 24 so as to compression mold pellet 20 into a liner that is welded or bonded to the interior surface of the cap base. That is, referring to FIG. 3, the charge pellet is compression molded in situ against the base 30 of cap 22 so as to form a liner 20a. This may be accomplished by hand, or more preferably with the machine disclosed in the above-noted U.S. Pat. No. 5,451,360. Cap 22 also includes a skirt 32 that extends from the periphery of base 30, having internal threads 34 for securing cap 22 to a container. Alternatively, pellet 20 may be separately compression molded to form liner 20a, which may then be adhesively secured within cap 22 against base 30. Such an operation requires additional steps and expense, and is therefore not preferred. As a second alternative, the liner may be formed in the closures as disclosed in U.S. Pat. Nos. 3,674,393, 3,702,148, 3,877,497 and 4,518,336. FIG. 6 illustrates an alternative liner 20b having a flat geometry, as opposed to the liner 20a of FIG. 3 having a thickened periphery. FIG. 7 illustrates a liner 20c having a flat periphery and a thickened mid section for holding additional barrier material.

Samples have been fabricated and tested in implementation of the present invention. In these samples, the matrix polymer was EVA marketed by DuPont under the trademark ELVAC650. The barrier polymer was either EVOH marketed by Evalca under the trade designator E105B, or nylon marketed by DuPont under the trademark SELAR PA. The compatabilizer was a maleic anhydride grafted polymer marketed by Mitsui Petrochemical under the trade designation ADMER QF551.

A first series of samples were fabricated from a compression molded liner film (i.e., not disposed in caps 22). These test samples were fabricated by extruding material at the desired ratio through the extrusion system of FIG. 1 at a melt temperature of 380 to 440° F. The extrudate possessed 129 layers. The extrudate, still at melt temperature, was sandwiched between two Teflon-coated metal plates, with the layers either parallel or perpendicular to the planes of the plates. The assembly was then placed in a Carver press and compressed at about 450 psi for about 30 seconds to a film thickness of 25 to 30 mils. Shims were placed between the plates to determine final thickness. The assembly (plates and compressed film) was then removed from the press and placed in a room-temperature water bath for 15 seconds. The compressed film was then removed from the plates and dried. Oxygen permeability was measured according to ASTM D3985 at 100% relative humidity and 75° F.

Figure 4A:
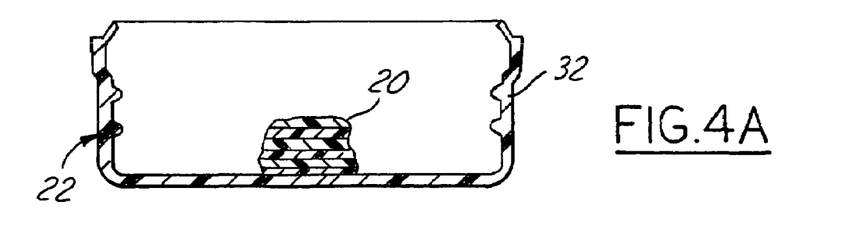
FIGS. 4A and 4B are schematic diagrams of charged pellets in closure caps in tests orientations described in the application.
Figure 4B:
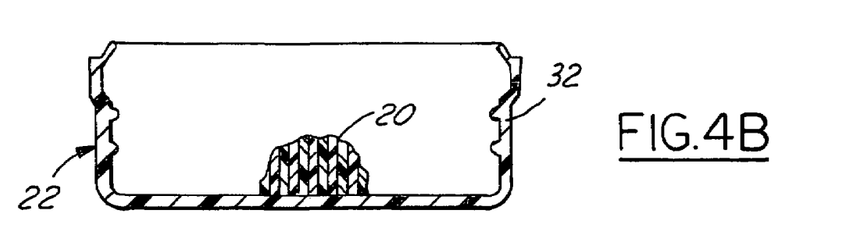

A first test sample of this first series was a control sample consisting of 100% EVA. A second sample was another control sample consisting of a blend of 25% EVOH, 65% EVA and 10% compatibilizer. A third test sample consisted of 10% EVOH, 80% EVA and 10% compatibilizer with the layers in the film oriented parallel to the plane of the liner film, as shown in FIG. 4A, prior to compression molding. A fourth test sample consisted of 10% EVOH, 80% EVA and 10% compatibilizer, this time with the layers in the film oriented perpendicular to the plane of the film as shown in FIG. 4B. A fifth test sample consisted of 10% nylon, 80% EVA and 10% compatibilizer with film layers oriented as in FIG. 4A, and a sixth test sample consisted of 10% nylon, 80% EVA and 10% compatibilizer with film layers oriented as in FIG. 4B. All films were of identical thickness of 25 to 30 mils. Table 1 illustrates the test results:

TABLE 1

| Test Sample | Oxygen Permeability (cc * mil/d * atm * 100 sq. in.) at 75° F. and 100% RH | Durometer (Shore A Scale) |
|---|---|---|
| (1) 100% EVA Control | 790 | 92 |
| (2) 25% EVOH, 10% c, 65% EVA (Blend) | 110 | 93 |
| (3) 10% EVOH, 10% c, 80% EVA (FIG. 4A) | 16 | 94 |
| (4) 10% EVOH, 10% c, 80% EVA (FIG. 4B) | 20 | 94 |
| (5) 10% Nylon, 10% c, 80% EVA (FIG. 4A) | 25 | 94 |
| (6) 10% Nylon, 10% c, 80% EVA (FIG. 4B) | 31 | 94 |

Figure 5A:
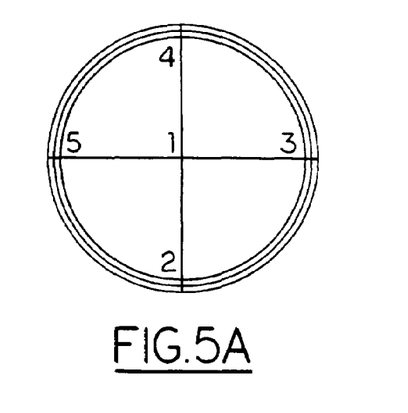
FIG. 5A is a schematic diagram of a closure showing points at which photomicrographs (FIGS. 5C-5G) were taken.
Figure 5B:
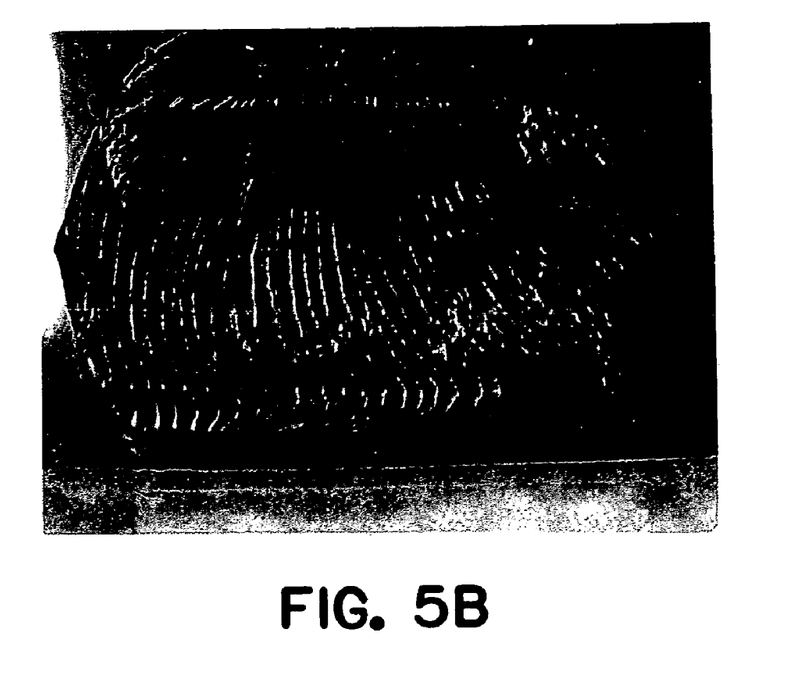
FIGS. 5B-5G are photomicrographs of test results obtained in implementation of the preferred embodiment of the invention.
Figure 5C:
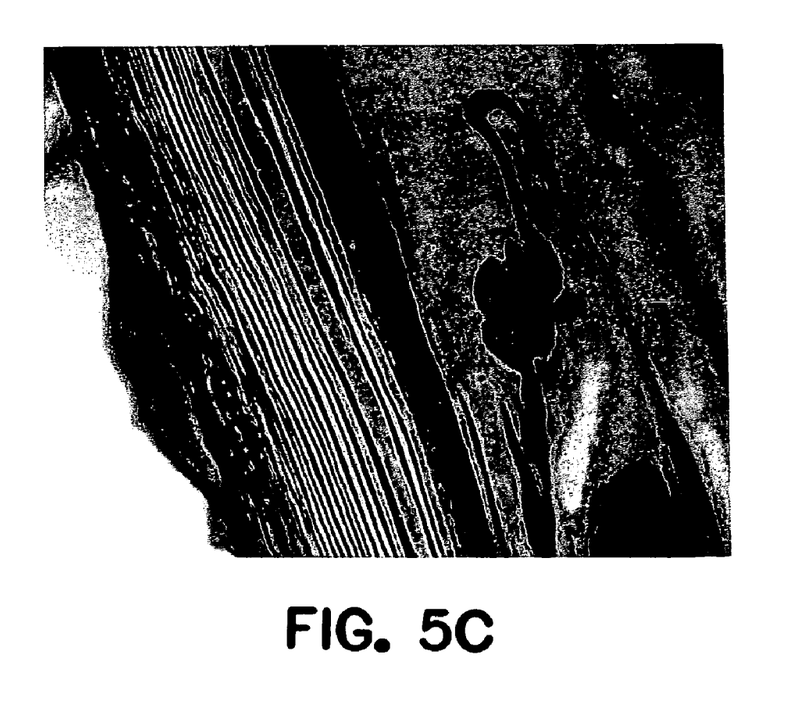
Figure 5D:
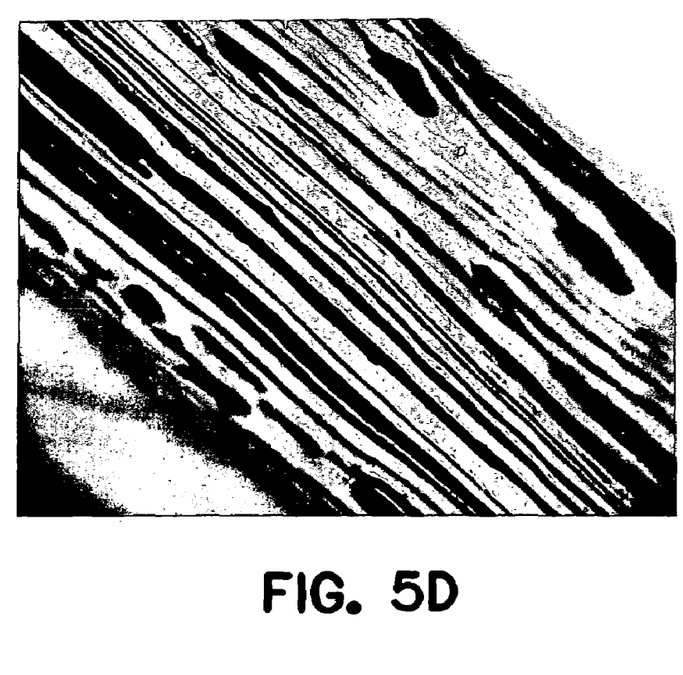
Figure 5E:
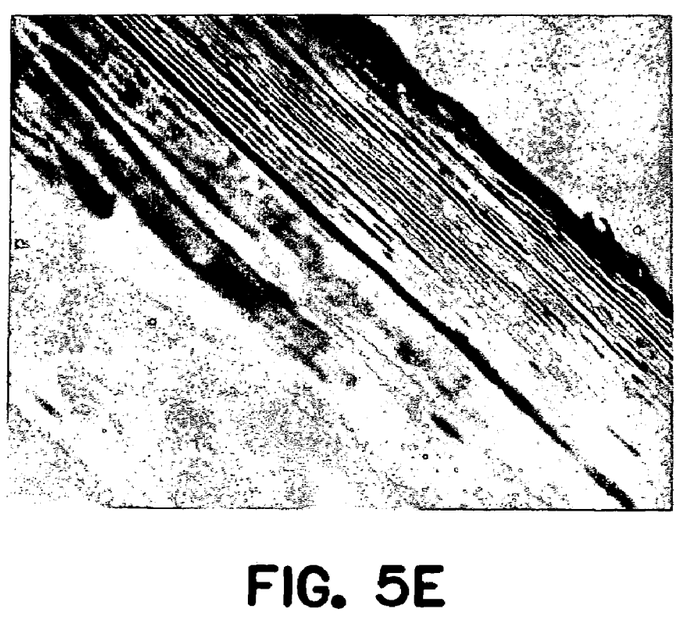
Figure 5F:
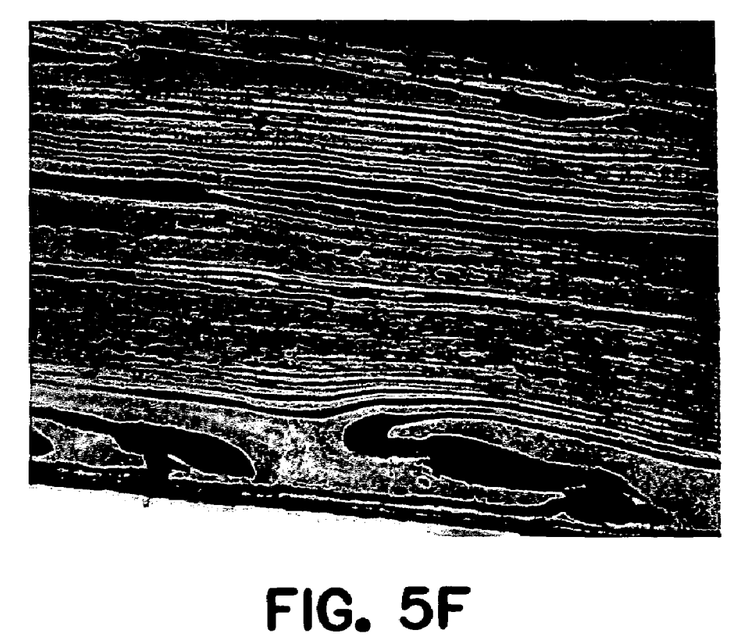
Figure 5G:
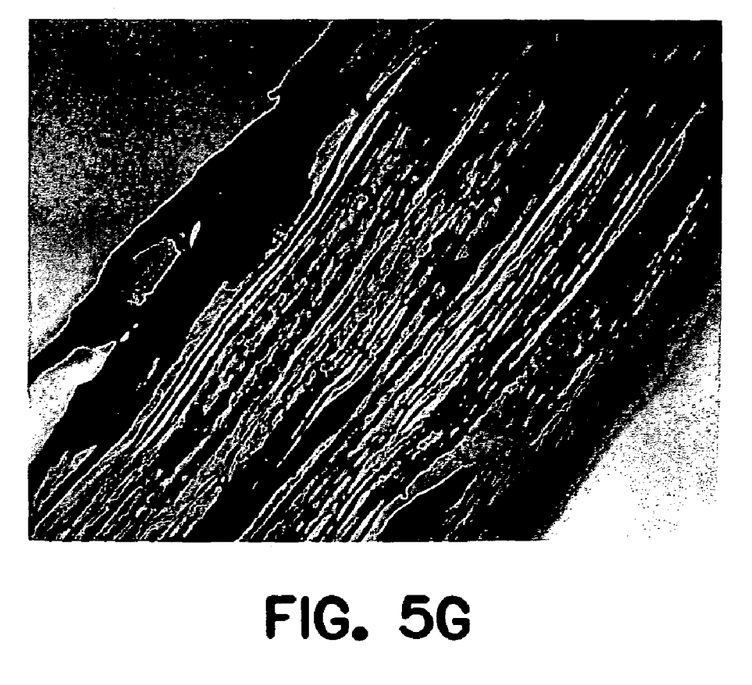

It will be noted that all of the test samples 3-6 in accordance with the present invention exhibited a marked reduction in oxygen permeability as compared with both the 100% EVA control sample 1 and the blend control sample 2. Indeed, as compared with blend sample 2, the test samples in accordance with the invention exhibited a marked reduction in oxygen permeability even with markedly less EVOH. This reduction in permeability at lesser EVOH is due to the layering in the film and the layer reorientation that takes place in the film during the compression molding operation. It will be noted in this respect that, although the test results for samples 3 and 5 in which the layers in the film were oriented parallel to the plane of the film as in FIG. 4A were slightly better than the test results when the layers were oriented perpendicular to the plane of the film as in FIG. 4B, the difference in results is not marked. This is believed to be due to the fact that the heat and pressure of the compression molding operation causes flow of the layered material radially outwardly so as to reconfigure the layered construction of the pellet even when the layers initially are perpendicular to the final film plane. This is also illustrated in FIGS. 5A-5G. FIG. 5A is a plan schematic diagram of a cap and liner illustrating five locations at which samples were cut and stained, and photomicrographs taken (FIGS. 5C-5G). FIG. 5B shows the initial pellet layer configuration, with layers in the charge pellet oriented essentially perpendicular to the plane of the cap base. The EVOH layers have taken up stain and are dark in FIGS. 5B-5G. FIG. 5B is at 10× magnification, while FIGS. 5C-5G are at 100× magnification. It is also to be noted that the hardness of the samples in Table 1 remains substantially constant, indicating that all samples are suitable for use as sealing liners.

Second and third sets of test samples were fabricated, this time in the form of liners compression molded into closures. The test materials were extruded through the system of FIG. 1 at a melt temperature of 440° F. in proportions to yield the desired weight ratios. Pellets 20 (FIG. 2) were manually cut from the extrudate and placed in closure shells 22. With the pellets 20 still at or near melt temperature, the closure and pellet were placed in a compression mold as in FIG. 2, and the compression tool was activated to compress the pellet. The film layer in all pellets were at the perpendicular orientation of FIG. 4B. The compression force was about 800 psi, and was held for about 15 seconds. Each test closure with liner was then threaded onto a PET bottle finish at industry standard application torque (25 to 30 inch-pounds for a 43 mm closure). The finish was then cut from the bottle and epoxied onto a metal plate surrounding a hole coupled to a purge tube. The plate with closure was then placed in a Mocon OXYTRAN oxygen permeability tester. Oxygen outside of the closure was maintained at 1 atm, 75° F. and 100% relative humidity, and nitrogen gas was used to purge the volume within the closure to measure oxygen concentration, and therefore oxygen permeation through the closure. When oxygen permeability reach steady state, the figure was recorded. A second set of samples consisting of 20% EVOH, 16% compatibilizer and 64% EVA were constructed from pellet layer orientations as illustrated in FIG. 4B. These samples, compression molded in situ into polypropylene caps, after two months of testing, measured an oxygen transmissivity of 0.001 cc/day, as compared with a transmissivity of 0.012 cc/day for an identical cap with a 100% EVA liner. All liners in all tests were of identical 0.025 inch thickness and a diameter of 1.509 inches.

A third set of test samples consisted of liners compression molded in situ into 43 mm plastic caps 22. All liners were 0.025 inches thick with a diameter of 1.509 inches. The following table illustrates the test results:

TABLE 2

| Sample | Oxygen Transmissivity (cc/day) |
|---|---|
| 1. 100% EVA Liner | 0.012 |
| 2. 34% EVOH, 1% compatibilizer, 65% EVA (blend) | 0.006 |
| 3. Layered 20% EVOH, 80% EVA/ compatibilizer | 0.0015 |

It thus can be seen, somewhat surprisingly, that oxygen transmissivity did not depend in the test samples on pellet layer orientation prior to molding. In all of the test samples discussed above, the pellets initially contained one hundred twenty-nine alternating layers of matrix polymer (EVA) and barrier polymer (EVOH or nylon), with the compatibilizer preblended with the matrix polymer. Other tests were run with similar materials containing only nine layers in the extruded pellet. When the layers in the initial pellet were oriented parallel to the final plane of the liner—i.e., parallel to the closure base as in FIG. 4A—the oxygen transmissivity was 0.0017 cc/day. When the layers were initially oriented perpendicular as in FIG. 4B, the oxygen transmissivity under identical test conditions was 0.0029 cc/day. It is believed that, as long as there is a sufficient number of layers in the extruded pellet and the final liner, the barrier properties of the liner will be achieved without regard to the orientation of the layers prior to molding.

It is preferable that the multiple layers each be of substantially uniform thickness, although this is not critical because of the multiplicity of layers. It is also preferred that each layer be of uniform composition. It is anticipated that additional layers of other materials exhibiting other desired properties may be employed in certain applications.

There have thus been disclosed a barrier liner, a closure with barrier liner, and a method of manufacturing the same, that fully satisfy the objectives and aims previously set forth. The liner is readily manufactured from otherwise conventional materials, and employing otherwise conventional techniques and equipment. The liner provides improved efficiency, in terms of the quantity of barrier material employed versus permeation and transmission of gasses such as oxygen and carbon dioxide, water vapor, and essential flavor oils (flavor scalping). Specific matrix/barrier combinations have been disclosed. Other combinations are envisioned for different applications, and will suggest themselves to persons or ordinary skill in the art based upon the principles and parameters herein discussed.

All U.S. patents and publications noted above are incorporated herein by reference.

The invention claimed is:

1. A method of making a plastic closure that comprises the steps of:
   (a) providing a plastic cap that includes a base and a peripheral skirt defining a cap interior,
   (b) placing within said cap interior, on said base, a mold charge that includes layers of matrix polymer material alternating with layers of barrier polymer material to resist transmission of gases, water vapor or flavorants, and compatibilizer material comprising a thermoplastic resin for tying the matrix polymer material to the barrier polymer material by reactive bonds or non-reactive adhesion mechanisms, and
   (c) compression molding said mold charge in situ within said cap interior against said base to form a liner on said base having layers of barrier polymer material alternating with layers of matrix polymer material.

2. The method set forth in claim 1 wherein said step (b) comprises orienting said mold charge so that said layers are at a predetermined orientation with respect to said base.

3. The method set forth in claim 1 wherein said step (b) is such that said layers in said mold charge are at random orientation with respect to said base.

4. The method set forth in claim 1 further comprising, prior to said step (b):
   (d) extruding mold charge material having said layers therein, and
   (e) severing said mold charge from the material extruded in said step (d).

5. The method set forth in claim 1 wherein said compatibilizer material is disposed in said matrix polymer material layers, or in said barrier polymer material layers, or in separate layers between said matrix polymer material and barrier polymer material layers.

6. The method set forth in claim 1 wherein said mold charge consists essentially of said matrix polymer material, said barrier polymer material and said compatibilizer material.

7. The method set forth in claim 6 wherein said barrier polymer material includes platelets of smectite clay.

8. The method set forth in claim 1 wherein said matrix polymer material is selected from the group consisting of thermoplastic elastomers, soft olefin polymers, and mixtures thereof.

9. The method set forth in claim 8 wherein said matrix polymer material is a thermoplastic elastomer having a Shore A hardness of 45 to 95 and a flexural modulus of 30,000 to 100,000 psi.

10. The method set forth in claim 8 wherein said matrix polymer material comprises at least one thermoplastic elastomer selected from the group consisting of styrene block copolymers and elastomeric alloys.

11. The method set forth in claim 10 wherein said matrix polymer material is an olefin polymer having a Shore A hardness less than 100.

12. The method set forth in claim 11 wherein said olefin polymer is selected from the group consisting of metallocene-made polyethylene, ethylene-propylene rubbers, ethylene copolymers, and mixtures thereof.

13. The method set forth in claim 1 wherein said barrier polymer material is selected from the group consisting of EVOH, crystalline, semi-crystalline and amorphous nylons, acrylonitrile copolymers, blends of EVOH and amorphous nylon, nanocomposites of EVOH or nylon and clay, blends of EVOH and an ionomer, acrylonitrile, cyclic olefin copolymers, and blends thereof.

14. The method set forth in claim 1 wherein said compatibilizer material is selected from the group consisting of maleic anhydride grafted polymers, ethylene vinyl acetate grafted polymers, ethylene methyl acrylate, ionomers and blends thereof.

15. The method set forth in claim 1 wherein said barrier polymer material comprises EVOH or nylon, and said matrix polymer material comprises EVA.

16. The method set forth in claim 1 wherein said matrix polymer material consists essentially of a blend of one or more matrix polymers and said compatibilizer material.

17. The method set forth in claim 1 wherein said mold charge consists of at least nine alternating layers of said matrix polymer and barrier polymer materials.

18. The method set forth in claim 17 wherein said liner consists of at least thirty-three alternating layers of said matrix polymer and barrier polymer materials.

19. The method set forth in claim 18 wherein said liner consists of at least one hundred twenty-nine alternating layers of said matrix polymer and barrier polymer materials.

20. The method set forth in claim 1 wherein said liner has a Shore A hardness of not more than 94.

21. The method set forth in claim 1 wherein mold charge contains lubricant selected from the group consisting of fatty acid amides, fatty acid esters, microcrystalline waxes, polyethylene glycols, primary amides, secondary amides, secondary-bis amides, and blends thereof.

22. The method set forth in claim 21 wherein said lubricant is in the amount of about 0.5% to 1.5% by weight of said mold charge.

23. The method set forth in 22 wherein said lubricant is in the amount of about 0.5% by weight of said mold charge.

24. A method of making a plastic closure that comprises the steps of:
   (a) extruding plastic mold charge material that consists essentially of: (1) continuous layers of matrix polymer material alternating with continuous layers of barrier polymer material to resist transmission of gases, water vapor or flavorants, totaling at least nine alternating layers of matrix and barrier polymer materials, and (2) compatibilizer material comprising thermoplastic resin for tying the layers of matrix polymer material to the layers of barrier polymer material by reactive bonds or non-reactive adhesion mechanisms, said compatibilizer material being disposed in said matrix polymer material layers, or in said barrier polymer material layers, or in separate layers between the matrix and barrier polymer material layers, (b) severing a mold charge pellet from the mold charge material extruded in said step (a), (c) providing a plastic cap that includes a base and a peripheral skirt defining a cap interior, (d) placing said mold charge pellet within said cap, and then (e) compression molding said mold charge pellet in situ within said cap against said base to form a liner on said base having continuous layers of barrier polymer material alternating with continuous layers of matrix polymer material.

25. The method set forth in claim 24 wherein said matrix polymer material is selected from the group consisting of thermoplastic elastomers, soft olefin polymers, and mixtures thereof.

26. The method set forth in claim 25 wherein said matrix polymer material comprises at least one thermoplastic elastomer selected from the group consisting of styrene block copolymers and elastomeric alloys.

27. The method set forth in claim 26 wherein said olefin polymer is selected from the group consisting of metallocene-made polyethylene, ethylene-propylene rubbers, ethylene copolymers, and mixtures thereof.

28. The method set forth in claim 24 wherein said barrier polymer material is selected from the group consisting of EVOH, crystalline, semi-crystalline and amorphous nylons, acrylonitrile copolymers, blends of EVOH and amorphous nylon, nanocomposites of EVOH or nylon and clay, blends of EVOH and an ionomer, acrylonitrile, cyclic olefin copolymers, and blends thereof.

29. The method set forth in claim 24 wherein said barrier polymer material includes platelets of smectite clay.

30. The method set forth in claim 24 wherein said compatibilizer material is selected from the group consisting of maleic anhydride grafted polymers, ethylene vinyl acetate grafted polymers, ethylene methyl acrylate, ionomers and blends thereof.

31. The method set forth in claim 24 wherein said mold charge material includes a lubricant selected from the group consisting of fatty acid amides, fatty acid esters, microcrystalline waxes, polyethylene glycols, primary amides, secondary amides, secondary-bis amides, and blends thereof.

32. A method of making a liner for a plastic closure that comprises the steps of:
(a) extruding a pellet that consists essentially of a multiplicity of alternating layers of matrix polymer material and barrier polymer material that resists gas transmission, and
(b) compression molding said pellet to form a liner disk in which the alternating material layers are oriented generally parallel to the disk.

33. The method set forth in claim 32 wherein said matrix polymer material consists essentially of a blend of one or more matrix polymers and a compatibilizer material.

34. The method set forth in claim 33 wherein the blend of matrix polymer and compatibilizer materials differs in melt viscosity from said barrier polymer material by no more than a factor of five.

35. The method set forth in claim 32 wherein said step (a) includes the step of extruding a compatibilizer material with said matrix and barrier polymer materials.

36. The method set forth in claim 35 wherein said compatibilizer material is blended with one or both of said matrix and barrier polymer materials prior to extrusion.

37. The method set forth in claim 35 wherein said matrix polymer material, said barrier polymer material and said compatibilizer material are extruded as separate layers.

38. The method set forth in claim 37 wherein layers of barrier polymer material and matrix polymer material alternate with each other, and wherein a layer of said compatibilizer material is disposed between each layer of barrier polymer material and each layer of matrix polymer material.

39. The method set forth in claim 35 wherein said barrier polymer material is in the range of about 6% to 35% by weight in said pellet, said compatibilizer material is in the range of about 6% to 20% by weight, the balance consisting of said matrix polymer material.

40. The method set forth in claim 32 wherein said matrix polymer material is selected from the group consisting of thermoplastic elastomers, soft olefin polymers, and mixtures thereof.

41. The method set forth in claim 40 wherein said matrix polymer material is a thermoplastic elastomer having a Shore A hardness of 45 to 95 and a flexural modulus of 30,000 to 100,000 psi.

42. The method set forth in claim 40 wherein said matrix polymer material comprises at least one thermoplastic elastomer selected from the group consisting of styrene block copolymers and elastomeric alloys.

43. The method set forth in claim 40 wherein said matrix polymer material is an olefin polymer having a Shore A hardness less than 100.

44. The method set forth in claim 43 wherein said olefin polymer is selected from the group consisting of metallocene polyethylene, ethylene-propylene rubbers, ethylene copolymers, and mixtures thereof.

45. The method set forth in claim 32 wherein said barrier polymer material is selected from the group consisting of EVOH, crystalline, semi-crystalline and amorphous nylons, acrylonitrile copolymers, blends of EVOH and amorphous nylon, nanocomposites of EVOH or nylon with clay, blends of EVOH and an ionomer, acrylonitrile, cyclic olefin copolymers, and blends thereof.

46. The method set forth in claim 32 wherein said pellet further includes a compatibilizer material comprising thermoplastic resin for tying the matrix polymer material to the barrier polymer material by reactive bonds or non-reactive adhesion mechanisms, with said compatibilizer material being selected from the group consisting of maleic anhydride grafted polymers, ethylene vinyl acetate grafted polymers, EVA, ethylene methyl acrylate, ionomers and blends thereof.

47. The method set forth in claim 32 wherein said liner consists of at least nine alternating layers of said matrix and barrier polymer materials.

48. The method set forth in claim 47 wherein said liner consists of at least thirty-three alternating layers of matrix and barrier polymer materials.

49. The method set forth in claim 48 wherein said liner consists of at least one hundred twenty-nine alternating layers of matrix and barrier polymer materials.

50. The method set forth in claim 32 that comprises the additional step of:
(c) providing a closure cap having a base and a peripheral skirt defining a cap interior and means on said skirt for securing the cap to a container, and
(d) securing said liner disk to the interior of said base.

51. The method set forth in claim 50 wherein said steps (b) and (d) are carried out simultaneously by compression molding said pellet in situ on the interior of said base.

52. The method set forth in claim 32 wherein said liner has a Shore A hardness of not greater than 94.

53. The method set forth in claim 52 wherein said liner contains a lubricant selected from the group consisting of fatty acid amides, fatty acid esters, microcrystalline waxes, polyethylene glycols, primary amides, secondary amides, secondary-bis amides, and blends thereof.

54. The method set forth in claim 53 wherein said lubricant is in the amount of about 0.5% to 1.5% by weight of said liner.

55. The method set forth in claim 54 wherein said lubricant is in the amount of about 0.5% by weight of said liner.

* * * * *